United States Patent [19]

Saffold

[11] Patent Number: 5,564,768
[45] Date of Patent: Oct. 15, 1996

[54] PORTABLE SECURITY TRUNK FOR UTILITY VEHICLES AND TRUCKS

[76] Inventor: David J. Saffold, 2435 Twin Creek Ct., Duluth, Ga. 30136

[21] Appl. No.: 277,683

[22] Filed: Jul. 20, 1994

[51] Int. Cl.⁶ .................................................. B60R 5/04
[52] U.S. Cl. .......................................... 296/37.6; 224/543
[58] Field of Search ................................. 296/37.5, 37.6, 296/37.16; 224/539, 543, 544

[56] References Cited

U.S. PATENT DOCUMENTS

| | | | |
|---|---|---|---|
| 4,828,312 | 5/1989 | Kinkel et al. | 296/37.6 |
| 4,938,519 | 7/1990 | Schlachter | 296/37.6 |
| 5,324,089 | 6/1994 | Schlachter | 296/37.6 |

*Primary Examiner*—Andrew C. Pike

[57] ABSTRACT

A portable trunk apparatus that creates a large, fully enclosed and secure trunk in the rear bed of trucks and sports utility vehicles. In accordance with the preferred embodiment of the present invention, the portable trunk apparatus is removably manually installable in and removably manually extractable from the truck without using tools. The portable trunk apparatus includes a top wall and a front wall connected together along edges thereof such that a completely enclosed trunk is formed in the rear of the truck when the present invention is properly installed above the floor and in front of the rear wall (and rear gate door) of the truck. Side walls extend along and above and below respective sides of the top wall. The portion of each side wall that extends below their respective side of the top wall functions as a partial side wall of the enclosure. The top wall includes top latches extending from a upper, outer surface of the top wall proximate the rear wall of the truck. The top latches are removably manually inserted under and latch to corresponding rear latches integrally connected to the rear wall of the truck. The front wall includes front latches connected to and extending from a rearward, inner surface thereof. The front latches removably manually latch onto corresponding floor latches mounted to the floor of the truck.

2 Claims, 5 Drawing Sheets

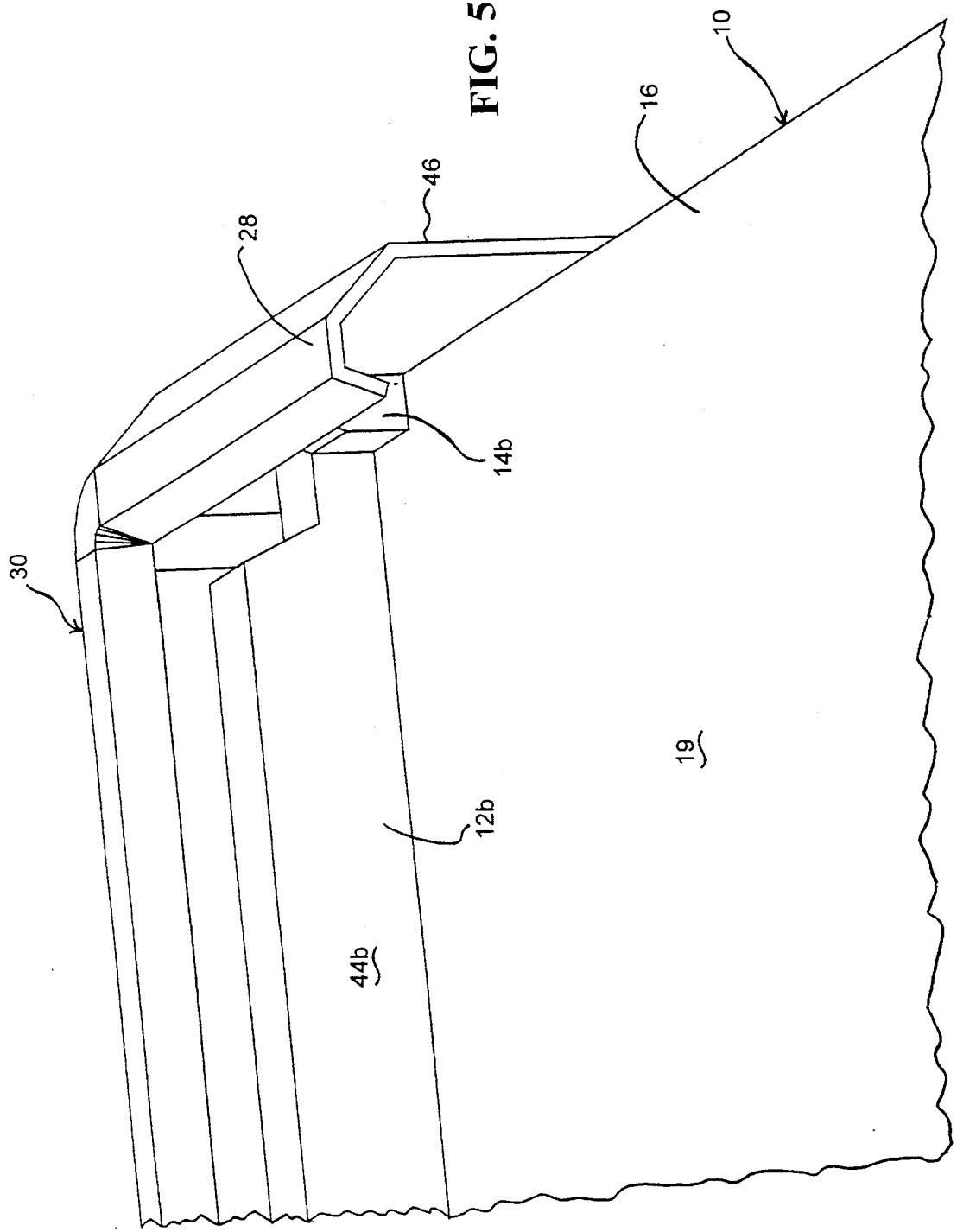

PORTABLE SECURITY TRUNK FOR UTILITY VEHICLES AND TRUCKS

BACKGROUND OF THE INVENTION

The present invention relates to the field of storage trunks for motor vehicles, and more particularly to storage trunks for trucks and sports utility vehicles.

Flatbed trucks of the type with open bed cargo areas such as the Jeep® Wrangler® truck are especially susceptible to unwanted intrusion. These vehicles generally have no large secure storage area (trunk) that will keep cargo and personal effects out of sight and secure. Articles left unattended in the truck are viewable by potential thieves and subject to theft and tampering. The theft of articles from these open vehicles is a major problem for owners. Moreover still, the threat of theft of articles is a major inconvenience to owners when shopping, traveling, or engaging in any other activity that involves transporting articles in the vehicle.

In the past, storage boxes and devices that create storage space in trucks have been devised to address the above described security problem. For the most part, these storage devices are relatively permanently installed (to prevent theft of the entire device and its contents) in the vehicle—usually by mounting the storage device to the rear bed of the truck with metal bolts or sheet metal screws. One consequence of permanently mounting the storage device in the rear bed of the truck is to reduce the cargo capacity of the truck and thus render the truck less useful for transporting cargo. Furthermore, if the owner needs to use the rear bed of the truck at its full size or for some other use, the storage device must be removed from its relatively permanent attachment to the vehicle with tools, which is a time consuming and laborious operation for the owner.

One such past storage device on the market today is disclosed in U.S. Pat. No. 4,938,519 issued to Bradley S. Schlachter. This storage device is installed in the rear bed of the Jeep® Wrangler® truck behind the back seat and adjacent the rear gate door and forms an enclosure with relatively little storage capacity. Schlacher's storage device basically consists of a top wall and a front wall connected together to form an L-shaped device such that when installed, the rear bed side walls and the rear gate door of the truck form the rest of an enclosure. This storage device is also designed to be permanently mounted to the vehicle's chassis by screwing sheet metal screws through flanges of the storage device and into holes drilled into the rear bed side walls of the vehicle. Thus, Schlacher's storage device suffers on the owner those inconveniences mentioned above in addition to providing relatively little storage capacity.

There is, therefore, a need in the industry for a devise that addresses the problems outlined above as well as other related and unrelated problems.

SUMMARY OF THE INVENTION

The present invention is a portable trunk apparatus that creates a large, fully enclosed and secure trunk in the rear bed of trucks and sports utility vehicles.

In accordance with the preferred embodiment of the present invention, the portable trunk apparatus includes a top wall and a front wall connected together along edges thereof such that a completely enclosed trunk is formed in the rear of the truck when the present invention is properly installed above the floor and in front of the rear wall (and rear gate door) of the truck. Side walls extend along and above and below respective sides of the top wall. The portion of each side wall that extends below their respective side of the top wall functions as a partial side wall of the enclosure, whereas the portion of each side wall that extends above their respective side of the top wall functions to retain cargo placed on the upper, outer surface of the top wall. The top wall includes top latches extending from the upper, outer surface of the top wall proximate the rear wall of the truck. The top latches are removably manually inserted under and latch with corresponding rear latches integrally connected to the rear wall of the truck. The front wall includes front latches connected to and extending from a rearward, inner surface thereof. The front latches removably manually latch onto corresponding floor latches mounted to the floor of the truck.

In accordance with the preferred embodiment of the present invention, the portable trunk apparatus is removably manually installable in and removably manually extractable from the truck without requiring tools. Thus, the user is provided with a quick and easy means for converting the rear bed area of the truck into a large, secure storage trunk.

It is therefore an object of the present invention to provide a large, secure storage trunk in the rear bed of a truck.

Another object of the present invention is to provide a system for conveniently and securely storing and transporting articles in the rear bed of trucks.

Yet another object of the present invention is to quickly and conveniently convert the rear area of a truck into a large secure trunk without the aid or need for tools.

Other objects, features, and advantages of the present invention will become apparent upon reading and understanding this specification, when taken in conjunction with the accompanying drawings.

BRIEF DESCRIPTION OF THE DRAWINGS

FIG. 5 is a close-up, partial view of the portable trunk apparatus of FIG. 1 when properly installed in the truck of FIG. 3.

DETAILED DESCRIPTION OF THE PREFERRED EMBODIMENT

Figure 1:
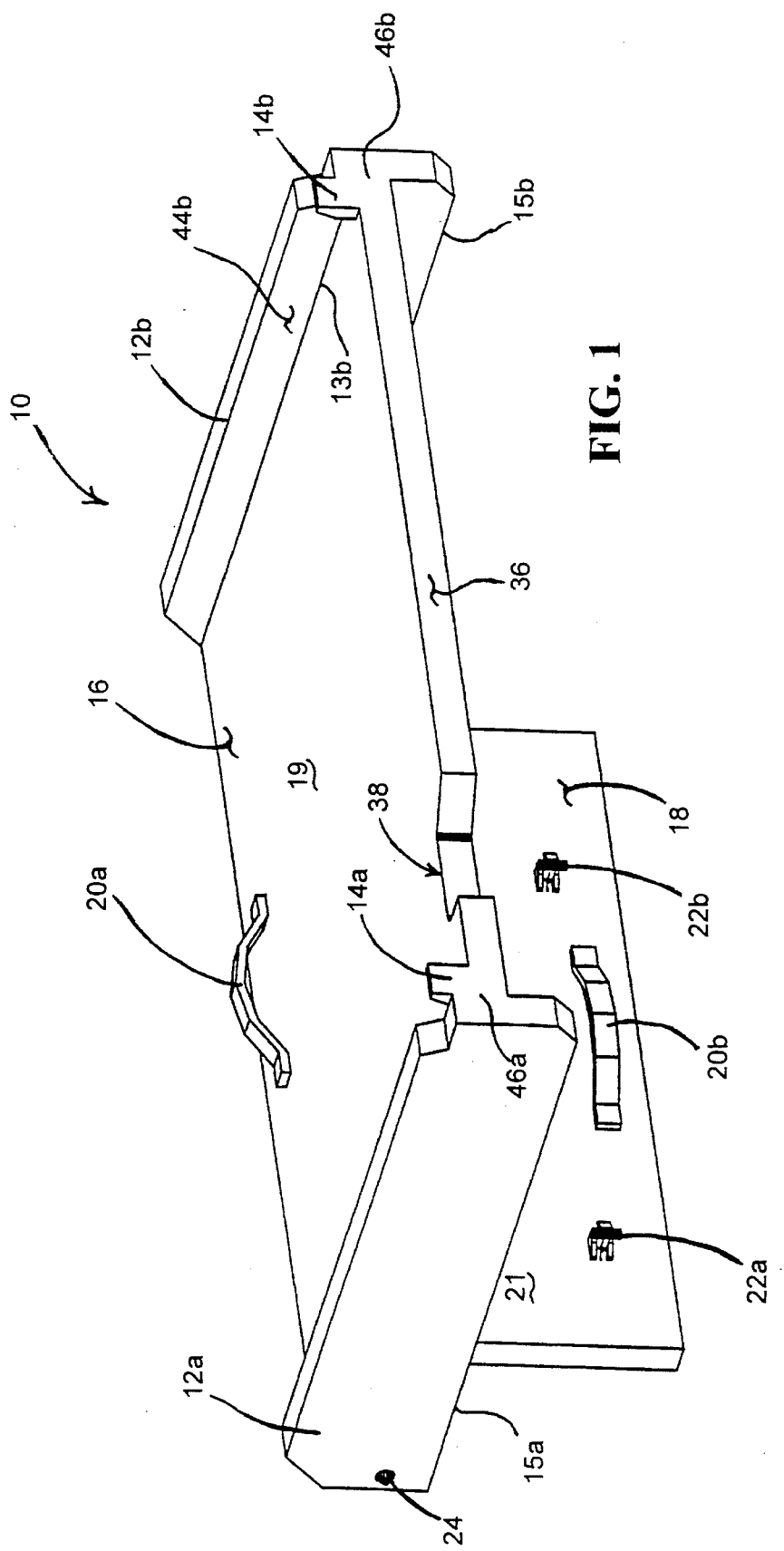
FIG. 1 is an isolated, left side, rear perspective view of a portable trunk apparatus, in accordance with the preferred embodiment of the present invention.
Figure 2:
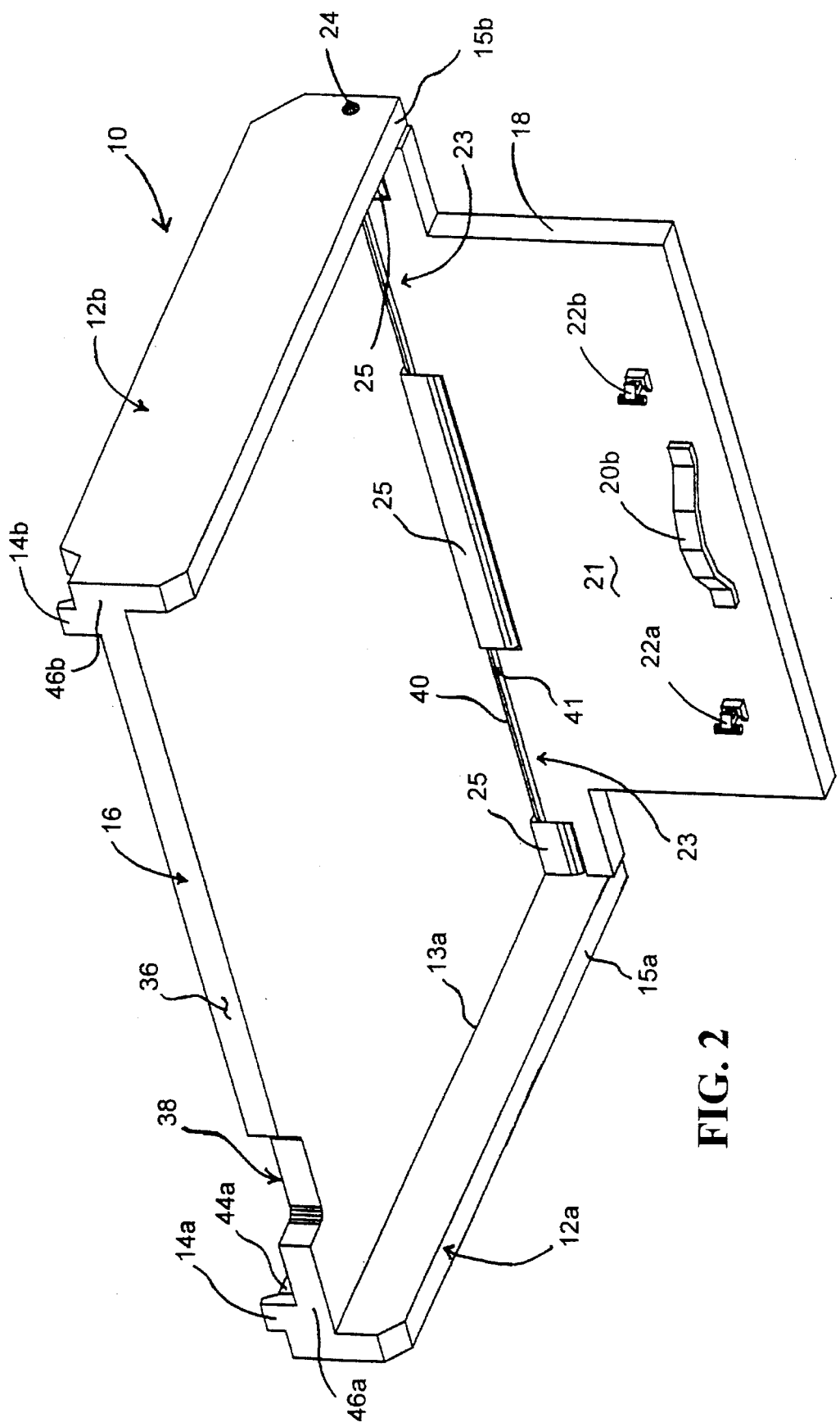
FIG. 2 is an isolated, bottom, rear perspective view of the portable trunk apparatus of FIG. 1.

Referring now to the drawings in which like numerals represent like components throughout the several views, FIGS. 1 and 2 are isolated, perspective views of a portable trunk apparatus 10, in accordance with the preferred embodiment of the present invention. The portable trunk apparatus 10 includes a top wall 16 connected to a front wall 18. A forward edge 40 of the top wall 16 is joined to an upper edge 41 of the front wall 18. The portable trunk apparatus 10 further includes a right side wall 12b and a left side wall 12a. The right side wall 12b fits along a right side 13b of the top wall 16 and the left side wall 12a fits along a left side 13a of the top wall 16. In this preferred embodiment, each of the side walls 12a,b extend above and below the respective sides 13a,b of the top wall 16. A bottom surface 15b of the right side wall 12b and a bottom surface 15a of the left side wall 12a rests along the upper surface of a right tire well 17b and the upper surface of a left tire well 17a of a truck 30, respectively, when the portable trunk apparatus 10 is properly installed therein (see FIG. 4). In accordance with the preferred embodiment of the present invention, the portable trunk apparatus 10 is shown useable in the Jeep® Wrangler® truck, therefore, references to the truck 30 refer generally to the Jeep® Wrangler® truck of FIGS. 3,4,5. However, the scope of the present invention includes the use of the portable trunk apparatus 10 of the present invention in other similar flatbed vehicles including pickup trucks and sports utility vehicles. An upper portion 44a of the side wall 12a and an upper portion 44b of the side wall 12b function to retain cargo placed on an upper, outer surface 19 of the top wall 16. A top handle strap 20a is attached to the upper, outer surface 19 of the top wall 16 and a bottom handle strap 20b is attached to a rearward, inner surface 21 of the front wall 18. The top handle strap 20a and the bottom handle strap 20b facilitate handling the portable trunk apparatus 10. A rear surface 36 of the top wall 16 defines a notch 38 for accommodating the truck's 30 rear door lock housing 39 (FIG. 4).

In accordance with the preferred embodiment of the present invention, a connector rod 24 hingedly connects the front wall 18 to the top wall 16. The connector rod 24 fits through bores (shown occupied by the connector rod 24) defined through front wall latching protrusions 23 and top wall latching protrusions 25. The front wall latching protrusions 23 integrally extend vertically upward from the upper portion of the front wall 18 to form the top edge 41 thereof, and the top wall latching protrusions 25 extend vertically downward from the bottom surface of the top wall 16 to form the front edge 40 thereof. The front wall latching protrusions 23 and top wall latching protrusions 25 are spaced such that they interconnect and align when the top wall 16 and front wall 18 are properly joined to one another.

A right lip stud 14b and a left lip stud 14a substantially vertically extend from the upper, outer surface 19 of the top wall 16 proximate respective right and left rear corners 46b,a of the top wall 16. The lip studs 14a,b are shaped to removably manually latch into the truck's rear wall lips. A right rear wall lip 28 is clearly shown in FIG. 5 which is a close-up, partial view of the portable trunk apparatus 10 and truck combination of FIG. 3. A left rear wall lip (not shown) is identical to the right rear wall lip 28 whereby both rear wall lips shall hereafter be denoted by the element number 28 unless otherwise specified. In the preferred embodiment, the rear wall lips 28 are metal overhangs extending into the interior of the rear bed of the truck 30 from the top portion of the rear wall 46 of the truck 30. A right stud clip 22b and a left stud clip 22a are attached to and extend from the rearward, inner surface 21 of the front wall 18. In accordance with the preferred embodiment of the present invention, the stud clips 22a,b are spring loaded and each include a wedge shaped tip which removably manually latches onto corresponding seat studs 26a,b, as shown in FIG. 4—FIG. 4 is a rear perspective view of the portable trunk apparatus 10 and truck 30, when the portable trunk apparatus 10 is properly installed in the truck 30. The seat studs 26a,b are attached to and extend from the truck bed floor 34 and, in the Jeep® Wrangler® truck 30, also function to fasten the portable rear seat (not shown) to the rear bed floor 34. However, other latching mechanisms which operate to manually removably secure the front wall 18 against the floor 34 of the truck 30 and the top wall 16 against the rear wall 46 of the truck 30 (i.e., in a position similar to that shown in the drawings) would be obvious to persons reasonably skilled in the art and are considered to be within the scope of the present invention.

Figure 3:
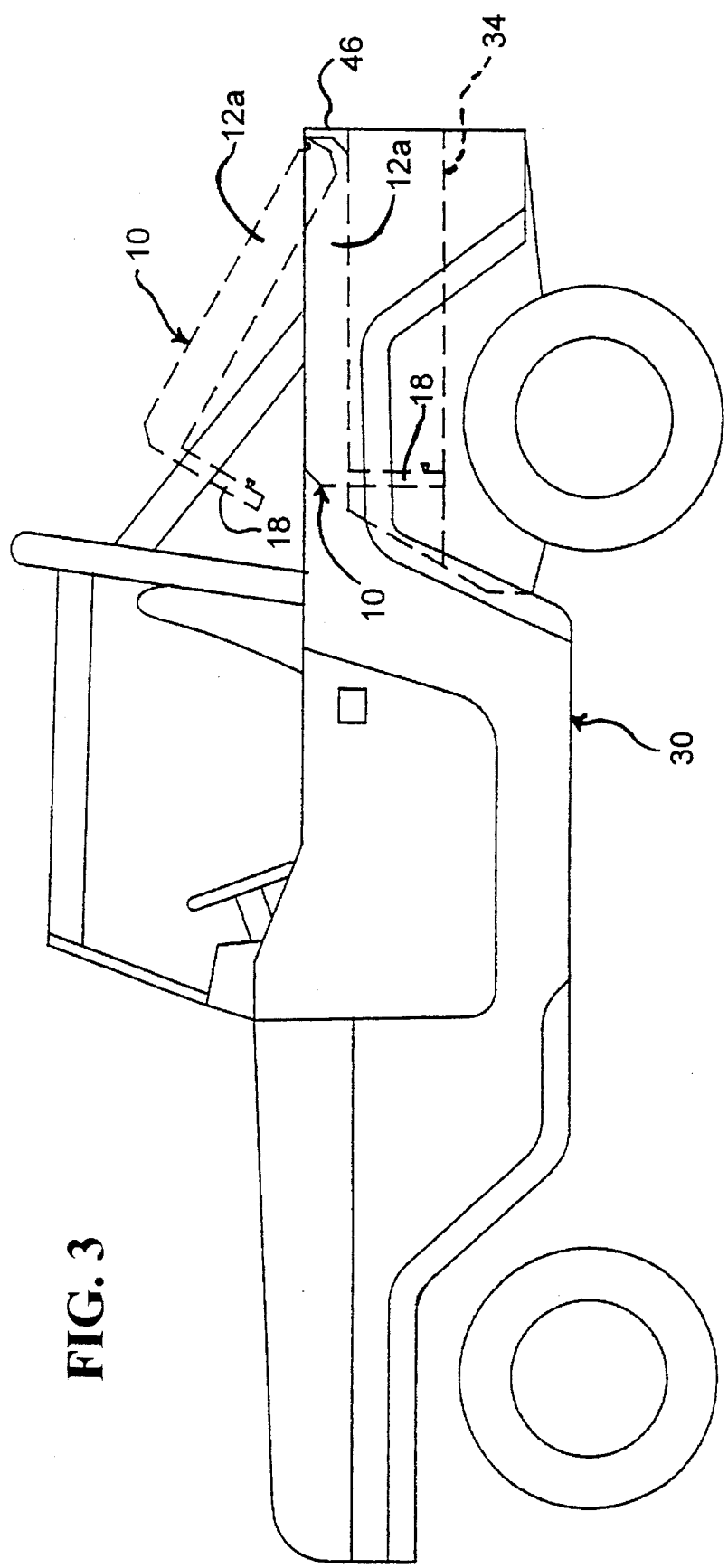
FIG. 3 is an elevational view of the portable trunk apparatus of FIG. 1 and a Jeep® Wrangler® truck, wherein the portable trunk apparatus is shown in an intermediary and installed position in the rear of the truck.
Figure 4:
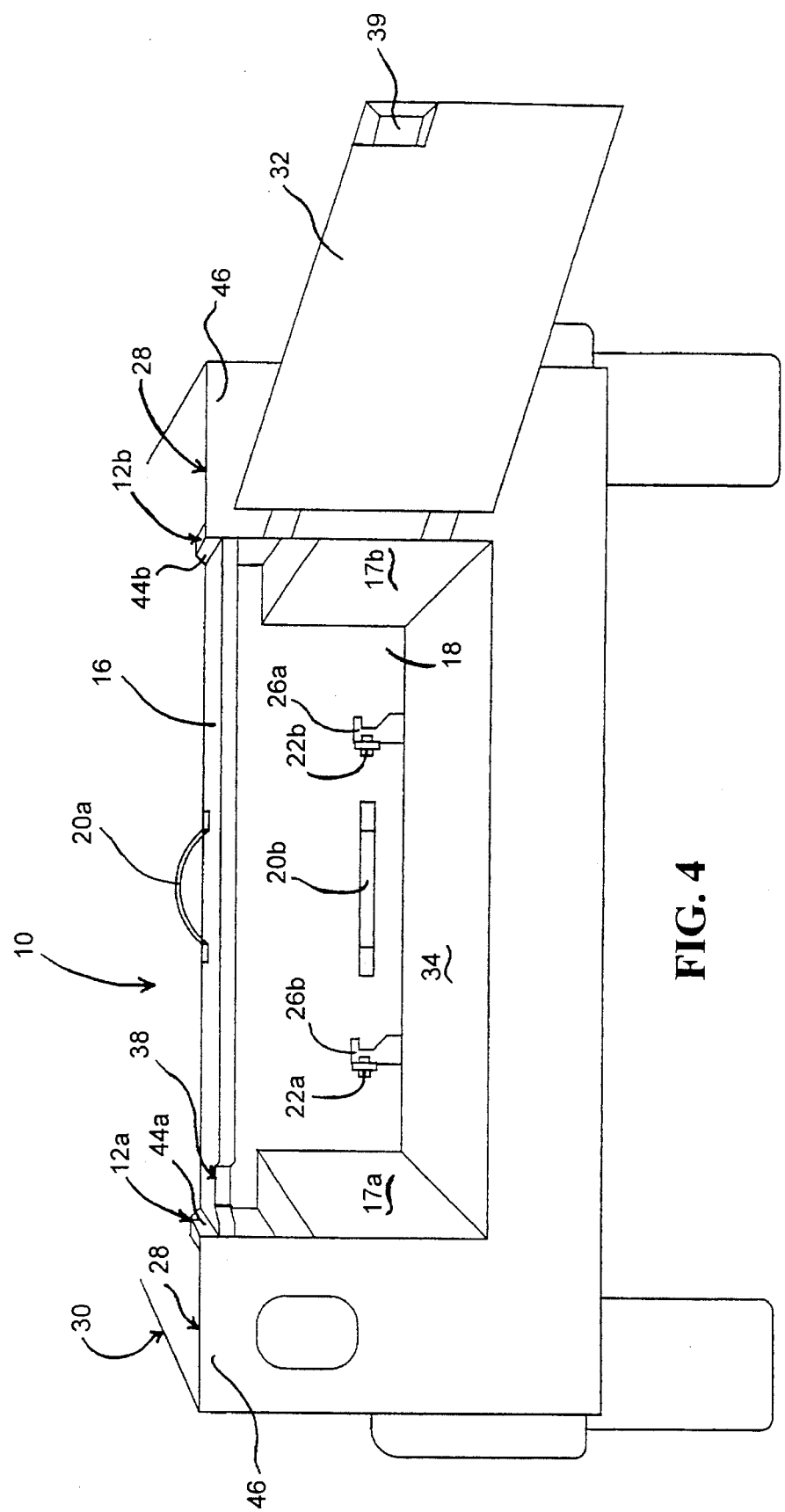
FIG. 4 is a rear perspective view of the portable trunk apparatus of FIG. 1 when properly installed in the truck of FIG. 3

Now referring to FIGS. 3–5, FIG. 3 is an elevational view of the portable trunk apparatus 10 and the truck 30 when the portable trunk apparatus 10 is in an intermediary and installed position in the truck 30. In accordance with the preferred embodiment of the present invention, the portable trunk apparatus 10 creates a large, secure, fully enclosed compartment in the rear bed of the truck 30 when properly installed therein. Furthermore, the portable trunk apparatus 10 of the present invention is conveniently portable being quickly and easily installed into and extracted from the truck 30 without requiring the aid of tools. In accordance with the preferred embodiment of the present invention, the portable trunk apparatus 10 is installed into the rear bed of the truck 30 by first lifting the portable trunk apparatus 10, by grasping the top handle strap 20a, to an intermediary position (shown in broken lines in FIG. 3) and simultaneously inserting the lip studs 14a,b into their corresponding rear wall lips 28 (refer to FIG. 5). Next, the portable trunk apparatus 10 is lowered such that the front wall 18 and the stud clips 22a,b are positioned behind the seat studs 26a,b. The lip studs 14a,b securely latch onto their corresponding rear wall lips 28 after the portable trunk apparatus 10 has been lowered and the top wall 16 is substantially horizontally positioned. The front wall 18 is next pushed forward and the stud clips 22a,b latched onto their corresponding seat studs 26a,b. The front wall 18 is shaped to fit snugly between and on top of the tire wells 17a,b of the truck 30. The portable trunk apparatus 10 is now securely installed into the rear bed of the truck 30 and is accessible only through the lockable rear gate door 32.

The removal of the portable trunk apparatus 10 from the truck 30 requires access to the interior of the portable trunk apparatus 10 and basically involves performing the above installation steps in reversed order. First, simultaneously unlatch the stud clips 22a,b from their corresponding seat studs 26a,b and push the front wall 18 forward so that the stud clips 22a,b clear the seat studs 26a,b. Then grasp the top handle strap 20a and pivot the portable trunk apparatus 10 up so that the lip studs 14a,b are lowered out of and unlatch from the rear wall lips 28. The portable trunk apparatus 10 can now be lifted away from the truck 30. It should be understood that the method of operation just described, is the method of operating the portable trunk apparatus 10 of the preferred embodiment and would change accordingly with other embodiments of the invention (e.g., to accomodate the use of alternate latching mechanisms, etc.).

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. A manually installable and removable portable trunk for a truck including a cargo area partially defined by a floor, left and right side walls, and a rear wall, said portable trunk comprising, in combination:

a top wall;

a front wall attached to said top wall along adjoining edges thereof for forming a partial box to substantially close off the cargo area when said top and front walls joined together are installed above said floor and in front of said rear wall, respectively;

one or more front wall latching members attached to and extending from a rearward, inner surface of said front wall;

one or more floor latching members attached to and extending from said floor, said floor latching members being removably manually latchable with said front wall latching members for removably manually securing, without requiring hand tools, said front wall against said floor;

one or more top wall latching members attached to and extending from an upper, outer surface of said top wall; and one or more rear wall latching members attached to and extending from an upper, inner surface of said rear wall, said rear wall latching members being removably manually latchable with said top wall latching members for removably manually securing, without requiring hand tools, said top wall against said rear wall.

2. A manually installable and removable portable trunk for a truck including a cargo area partially defined by a floor having a plurality of seat studs, left and right side walls, and a rear wall having a plurality of rear wall lips, said portable trunk comprising:

a top wall having an upper, outer surface and a lower, inner surface;

a front wall having a forward, outer surface and a rearward, inner surface;

hinge means for hingedly joining said top and front walls together along adjoining edges thereof for forming a partial box to close off the cargo area when the top and front walls joined together are installed above the floor and in front of the rear wall, respectively;

a plurality of spring loaded clips rigidly attached to said rearward surface and being removably manually lockable with the respective seat studs for removably securing said front wall to the floor; and a plurality of lip studs rigidly attached to and extending substantially vertically from said upper surface and being removably manually insertable under the respective rear wall lips for removably securing said top wall to the rear wall.

* * * * *